United States Patent [19]

Sugimoto et al.

[11] Patent Number: 4,860,209

[45] Date of Patent: Aug. 22, 1989

[54] RUNNING COMMAND SYSTEM FOR UNMANNED VEHICLE

[75] Inventors: Gunji Sugimoto; Takero Hongo, both of Aichi, Japan

[73] Assignee: Kabushiki Kaisha Toyota Chuo Kenkyusho, Aichi, Japan

[21] Appl. No.: 170,313

[22] Filed: Mar. 18, 1988

Related U.S. Application Data

[63] Continuation of Ser. No. 673,529, Nov. 21, 1984, abandoned.

[30] Foreign Application Priority Data

Nov. 24, 1983 [JP] Japan .................................. 58-221070

[51] Int. Cl.$^4$ ............................................. G06F 15/50
[52] U.S. Cl. .............................. 364/424.02; 180/169; 318/587
[58] Field of Search ................... 364/424.02, 443, 449, 364/457, 461; 180/167–169; 318/587; 340/52 F

[56] References Cited

U.S. PATENT DOCUMENTS

| | | | |
|---|---|---|---|
| 4,361,202 | 11/1982 | Minovitch | 180/168 |
| 4,438,422 | 3/1984 | Nojiri et al. | 340/52 F |
| 4,447,801 | 5/1984 | Masuda | 340/52 F |
| 4,465,155 | 8/1984 | Collins | 364/424 |
| 4,477,184 | 10/1984 | Endo | 180/169 |
| 4,530,056 | 7/1985 | MacKinnon et al. | 364/424 |
| 4,556,940 | 12/1985 | Katoo et al. | 364/424 |

Primary Examiner—Gary Chin
Attorney, Agent, or Firm—Roberts, Spiecens & Cohen

[57] ABSTRACT

In a running command system for an unmanned vehicle, path information is stored, a current running state is compared with running command instruction data, an end of an operation corresponding to the running command instruction data is detected, and new running command instruction data corresponding to the next operation is generated upon detection of the end of the operation. The optimal running command instruction data can be set to cause the unmanned vehicle to travel along a running path whose information is stored in a running course memory, thereby accurately guiding the unmanned vehicle to a destination.

19 Claims, 15 Drawing Sheets

| FIG. 7A | FIG. 7B | FIG. 7C |

| RUNNING COMMAND INSTRUCTION NUMBER | OPERATION NAME | END POINT NO. | PATH NO. | HEADING ANGLE | MOVING VELOCITY |
|---|---|---|---|---|---|
| A1 | A2 | A3 | A4 | A5 | A6 |

(b)

| POSITION NO. | X-COORDINATE | Y-COORDINATE |
|---|---|---|
| B1 | B2 | |

(c)

| PATH NO. | START POINT NO. | END POINT NO. | PATH TYPE | X-COORDINATE CENTER FOR RADIUS OF CURVATURE | Y-COORDINATE CENTER FOR RADIUS OF CURVATURE | RADIUS OF CURVATURE |
|---|---|---|---|---|---|---|
| C1 | C2 | C3 | C4 | C5 | | C6 |

(d)

| NO. | OPERATION | COORDINATE OF START POINT | COORDINATE OF END POINT | HEADING ANGLE | PATH TYPE | MOVING VELOCITY | COORDINATES OF CENTER OF RADIUS OF CURVATURE | RADIUS OF CURVATURE |
|---|---|---|---|---|---|---|---|---|
| D1 | D2 | D3 | D4 | D5 | D6 | D7 | D8 | D9 |

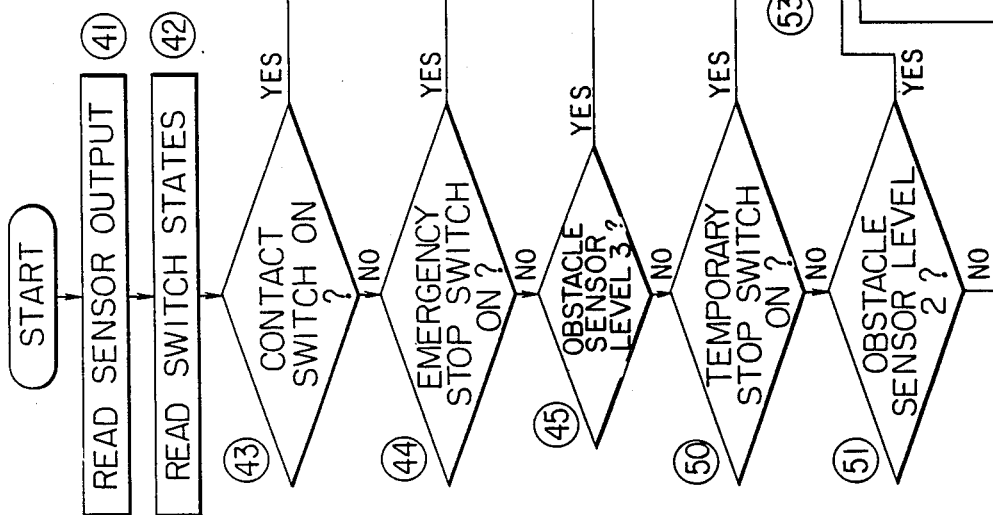

RUNNING COMMAND SYSTEM FOR UNMANNED VEHICLE

This is a continuation on application Ser. No. 673,529 filed Nov. 21, 1984, now abandoned.

BACKGROUND OF THE INVENTION

I. Field of the Invention

The present invention relates to a running command system for an unmanned vehicle and, more particularly, to a running command system for guiding to a destination the unmanned vehicle along a preset course which is not bound by specific guide members or the like.

II. Description of the Prior Art

A conventional unmanned vehicle is driven along guide wires embedded in the floor or along optical reflection tapes adhered along a predetermined course. In this system, a deviation of the unmanned vehicle from a guide member is detected, and the unmanned vehicle is steered in accordance with a correction value. The unmanned vehicle of this type is decelerated, stopped and travels from one running path to another running path in accordance with directions or instructions such as guide lines or markers installed in advance so that the unmanned vehicle is guided to the destination. Unlike the unmanned vehicle driven along guide members, the running path is occupied not only by the unmanned vehicle but also other vehicles and persons, thereby effectively utilizing the space. However, guide members are inevitably used, and a great amount of installation and maintenance cost is required, and unless special course arrangements are made beforehand the unmanned vehicle of this type cannot be used, then appropriate applications of the unmanned vehicle of this type are limited.

Several guidance systems for an unmanned vehicle without guide members have been proposed. In most of the conventional guidance systems without guide members, a conventional method for detecting a deviation of the unmanned vehicle from the guide members is replaced with a method of calculating a deviation from the running path in accordance with a rotational angle of a vehicle wheel or an angular velocity detected by a gyro. In order to correct the calculated deviation from the running path, the unmanned vehicle is automatically driven.

However, when the unmanned vehicle is guided to the destination, it is rarely guided along a simple linear running path. In practice, the unmanned vehicle must turn right or left at an intersection of several running paths, must be stopped at work position, and must be moved from the linear path to a curved path. In most of the conventional automatic guidance systems, the unmanned vehicle can be driven along a given running paths. However, stopping, turning and running mode switching which is inevitably performed during guidance of the unmanned vehicle has not been well considered up to the present.

For example, steering information such as a steering angle, a heading angle or a radius of curvature of the running path in accordance with the running distance is prepared as data. The running mode is switched by using running distance information obtained by accumulating the rotational angle of the wheel with reference to this data, so that the unmanned vehicle can be automatically steered. However, when only the steering information is used as guidance data and various types of running courses are prepared in a course network having many intersections, the steering information for all the running courses must be prepared. In other words, a great amount of data having high redundancy must be recorded, and a memory device is thus inefficiently used, resulting in inconvenience. In order to create the steering information, an operator must instruct the unmanned vehicle in all the running courses. In addition, the steering information corresponding to a running distance must be calculated in accordance with an area map and drawings.

When the running path is modified during travel of the unmanned vehicle, or the destination changes, running command instruction data must be updated. However, it is difficult to update the running command instruction data within a short period of time, thus failing to provide a flexible system.

In order to eliminate this drawback, steering information is digitized for each running path in an entire course network. During travel of the unmanned vehicle, data correspondence to a given course is formated. However, when the technique of giving control information by the steering information corresponding to the running distance is employed, this cannot represent all information necessary for a general course but is limited to a course consisting of linear and right-angled paths, thus resulting in inconvenience.

The unmanned vehicle must be able to travel along a course consisting of various paths in a complicated running course network. Although demand has arisen for facility in giving running command instructions to the unmanned vehicle, this demand has not been realized until now.

In order to effectively utilize the unmanned vehicle system, a running course can be modified from a current moving position to set a new destination so as to satisfy needs for an emergency. However, when the conventional technique is used, complicated calculations must be performed to determine the current moving position of the unmanned vehicle. As a result, according to the guidance system for switching the running mode in accordance with the accumulated running distance, complicated processing is required since the current position of the unmanned vehicle must be obtained by complicated calculations, a proper path is selected in accordance with a relationship between the current moving position and the destination, and a motion program must be created to guide the unmanned vehicle along the proper path in accordance with the running distance.

SUMMARY OF THE INVENTION

It is an object of the present invention to eliminate the conventional drawbacks of the conventional running command system for guiding an unmanned vehicle along a preset course which is not bound by specific guide members or the like. More particularly, the object of the present invention is to provide a running command system for moving the unmanned vehicle along a proper path and guiding it to a destination by determining a running mode of operation of the unmanned vehicle in accordance with position information of the unmanned vehicle and running state information in such a manner that the running mode is set to stop the unmanned vehicle by detecting a state wherein the unmanned vehicle approaches a stopping point so as to smoothly and accurately stop the unmanned vehicle, or that the running mode is set to automatically turn the unmanned vehicle when the unmanned vehicle approaches a right angle turn.

It is another object of the present invention to provide a running command system having an improved operability wherein running course network information is prestored, and running command instruction data for guiding the unmanned vehicle to the destination is supplied in a simple data format in accordance with the running course network information.

It is still another object of the present invention to provide a running command system having a running command instruction data updating function when an abnormal state is detected in order to obtain the higher reliability required for automatically driving the unmanned vehicle, thereby allowing the unmanned vehicle to travel properly even in an abnormal state.

In order to achieve the above objects of the present invention, a basic component of the running command system comprises running course memory means, operation end detecting means and running command instruction data creating means. The running course memory means stores path information up to the destination. The operation end detecting means compares running state information including position information and heading angle information of the unmanned vehicle with running command instruction data supplied to a running control unit and discriminates whether or not the end conditions of the operation satisfy running command instruction data. The running command instruction data creating means creates running command instruction data next to the running command instruction data which corresponds to the operation and which is given to the running control unit, in accordance with predetermined procedures with reference to the path information which represents a distance to the destination and which is stored in the running course memory means. The next running command instruction data is supplied to the running control unit. According to the present invention, the path data is stored in the memory, the end condition of the operation performed in accordance with this running command instruction data is detected, and the next running command instruction data is created in accordance with this detection. Therefore, the unmanned vehicle can be accurately guided to the destination.

In addition to the above basic arrangement, there are provided abnormality detecting means for detecting an abnormal state wherein the unmanned vehicle cannot be properly driven along the preset path, and running command instruction data generating means for generating new running command instruction data upon detection of the abnormal state by the abnormality detecting means in accordance with predetermined procedures using the running state information of the unmanned vehicle and the current running command instruction data supplied to the running control unit. As a result, the unmanned vehicle can be driven safely and with high reliability.

The above and other objects, features and advantages of the present invention will be apparent from the following detailed descriptions in conjunction with the accompanying drawings.

BRIEF DESCRIPTION OF THE DRAWINGS

FIG. 10 shows data formats of a running command instruction, position group data, path group data, and running command instruction data, respectively;

DETAILED DESCRIPTION OF THE INVENTION

Figure 1:
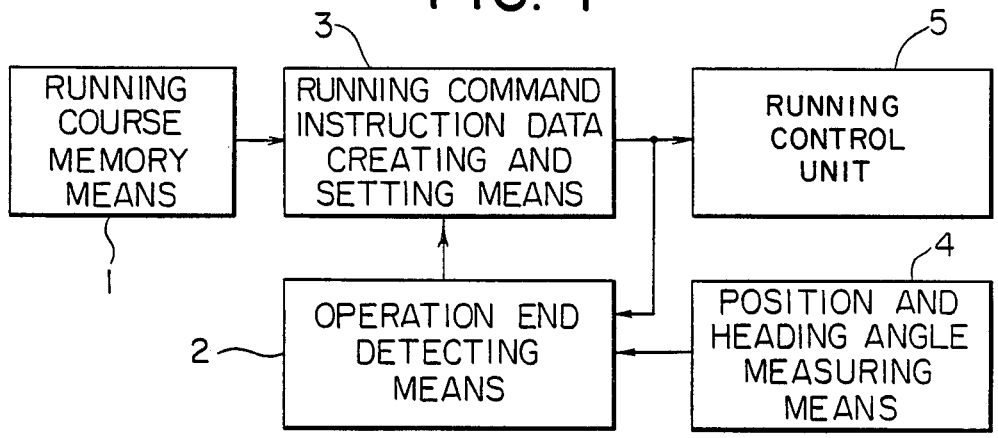
FIG. 1 is a block diagram showing the basic configuration of a running command system in an automatic guidance system for an unmanned vehicle according to the present invention.

FIG. 1 shows the basic configuration of a running command system for an unmanned vehicle according to the present invention. The running command system comprises a running course memory means 1, an operation end detecting means 2, and a running command instruction data creating/setting means 3. The running course memory means 1 stores path information representing a path up to a predetermined destination stored in the running course memory means 1. The operation end detecting means 2 compares running state information including the position and heading angle information of the unmanned vehicle which is generated from a position and heading angle measuring means 4 with running command instruction data supplied to a running control unit 5. The operation end detecting means 2 detects whether or not the end conditions of the operation corresponding to the preset running command instruction data satisfy this instruction data. The running command instruction data creating setting means 3, connected to said running course memory means and operation end detecting means, creates the next running command instruction data corresponding to the operation next to the operation of therunning command instruction data currently supplied to the running control unit 5, in accordance with predetermined procedures using the path information representing the path to the destination on the basis of the detection result of the operation end detecting means 2. The running control unit 5 causes the unmanned vehicle to travel, stop or turn in accordance with the updated running command instruction data.

The position and heading angle measuring means detects current running state values such as a position and heading angle of the unmanned vehicle and generates running state data. The driving means moves and turns the unmanned vehicle. The running controlling means has running state value predicting means, connected to the position and heading angle measuring means, and calculates state values representing the running state including at least a running position after a predetermined period of time in accordance with a relationship between a control value and a drive value such as moving and turning, which is determined by the driving means, and a relationship between the drive value and changes in the position and heading angle of the unmanned vehicle when a given control value is set in the driving means.

As apparent from the above description, the path information is stored, the currently measured running state is compared with the running command instruction data, an end of operation corresponding to this running command instruction data is detected, and the running command instruction data corresponding to the next operation is created in accordance with the detection result. Therefore, the unmanned vehicle can be accurately guided to the destination along the running path by information stored in the running course memory means. By determining a running mode corresponding to the operation of the unmanned vehicle, for example, by setting the running mode for stopping the unmanned vehicle, the unmanned vehicle is smoothly and accurately stopped at a predetermined stop position. On the other hand, when the unmanned vehicle approaches a right angle turn, another running mode is set to automatically turn the unmanned vehicle toward a proper direction. The unmanned vehicle is accurately driven along the running path and is thus guided to the destination.

Figure 2:
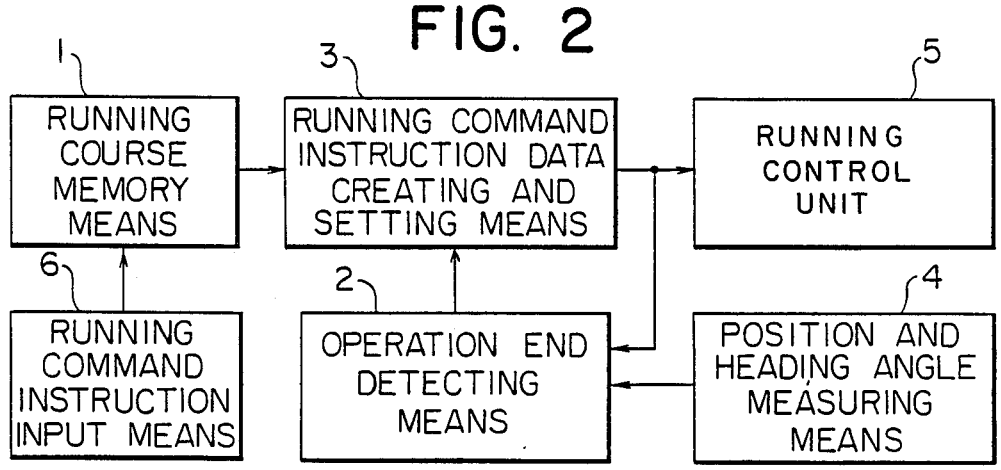
FIGS. 2 to 4 are block diagrams of running command systems according to embodiments of the present invention, respectively.

FIG. 2 shows an arrangement having a running command instruction input means 6, connected to said running course memory means, to externally input path information representing a path up to a destination whose information is stored in the running course memory means 1. The running command instructions for guiding the respective destination positions are given as needed from an external device such as a computer, thereby moving the unmanned vehicle to the desired destination positions.

Figure 3:
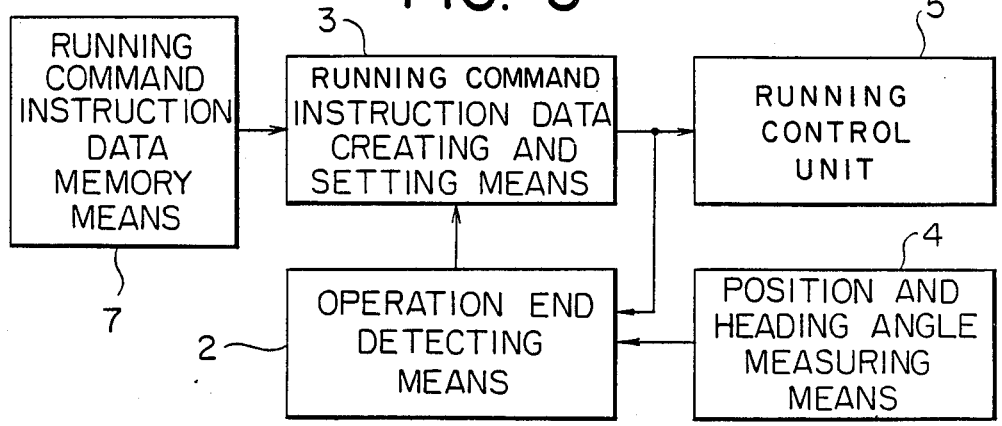

FIG. 3 shows an arrangement wherein the running course memory means 1 in FIG. 1 comprises running command instruction data memory means 7 for storing running command instruction data. The running command instruction data comprises a group of instruction data corresponding to operations to be sequentially performed so as to guide the unmanned vehicle to the destination. The running command instruction data creating/setting means 3 sequentially reads out the running command instruction data from the running command instruction data memory means 7 and supplies the readout data to the running control unit 5, so that the unmanned vehicle can be automatically guided to the destination.

Figure 4:
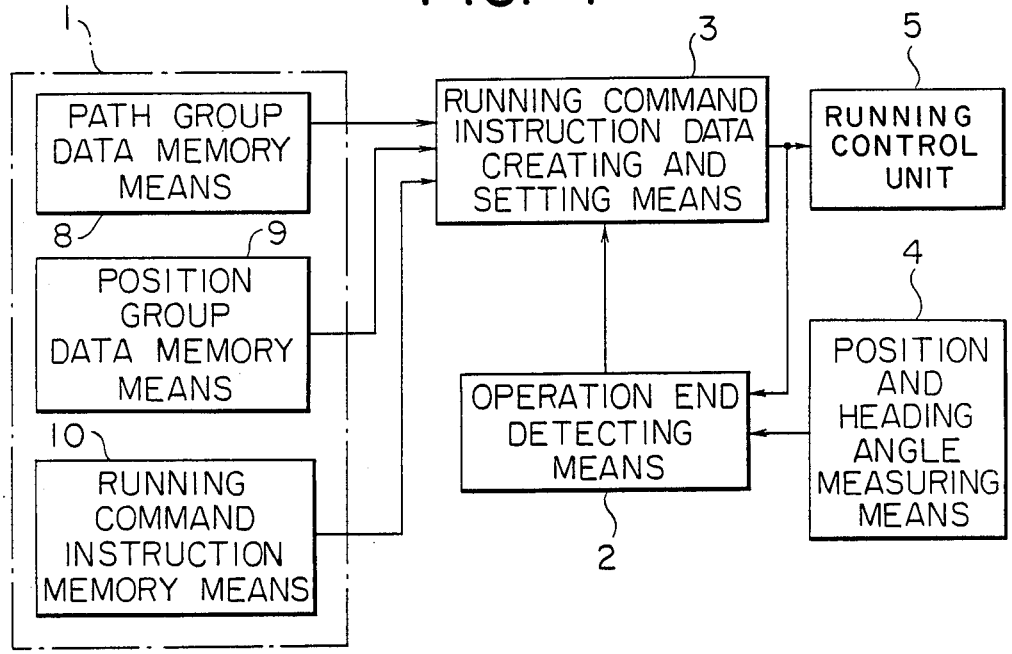

The running command system shown in FIG. 4 is an arrangement such that the running course memory means 1 shown in FIG. 1 comprises: a path group data memory means, connected to said running command instruction data creating and setting means, 8 for storing start point information, end point information and path shape information of the path constituting the running path network; a position group data memory means 9, connected to said running command instruction data creating and setting means, for storing coordinate point information of feature positions such as the start and end points of the path; and a running command instruction memory means 10, connected to said running command instruction data creating and setting means, for storing running path information for guiding the unmanned vehicle to the destination. The running command instruction data creating/setting means 3 creates and sets the necessary running command instruction data in accordance with predetermined procedures using the path group data, the position group data and the running command instruction from the respective means 8, 9 and 10. In this manner, the running course information consists of the path point group data, the position group data, the running command instruction, and the like. The running command instruction can be simplified. As a result, the running course instruction creation and its modification can be easily performed when the unmanned vehicle is guided to the destination.

In additdion, since the position group data and the path group data are stored to represent the running path network, a compact memory can be obtained wherein a small amount of data having no redundancy are stored.

Figure 5:
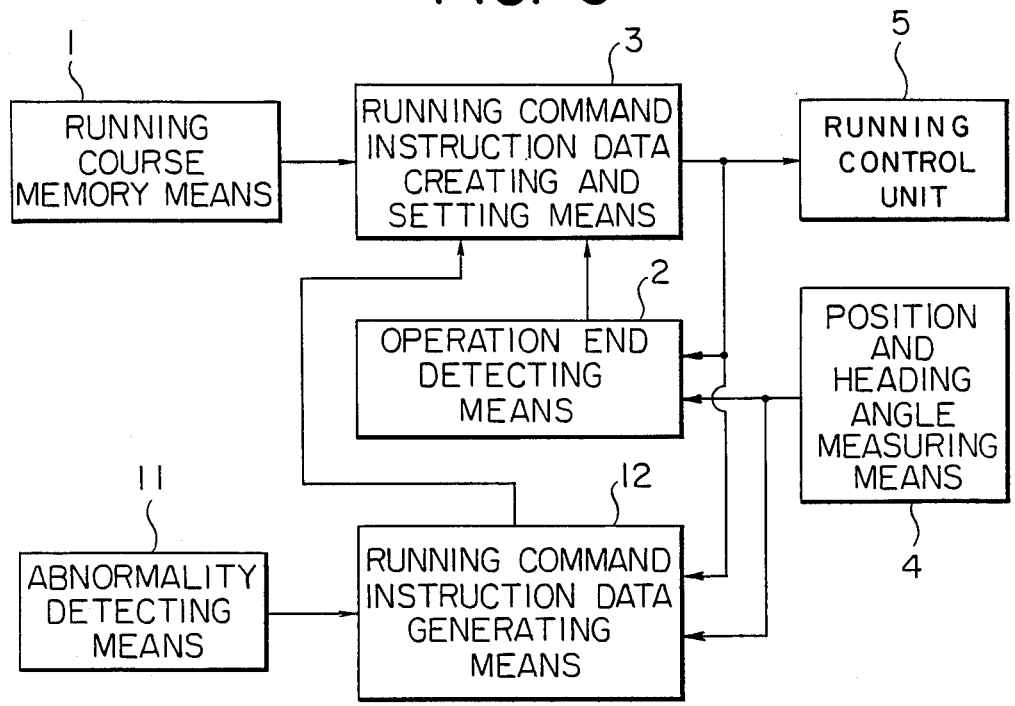
FIG. 5 is a block diagram showing a running command system obtained by adding abnormality detecting means to the basic configuration of FIG. 1 according to still another embodiment of the present invention.

FIG. 5 shows an arrangement obtained by adding to the system of FIG. 1 an abnormality detecting means 11 for detecting an abnormal state which is not suitable to guide the unmanned vehicle along the preset running path, and a running command instruction data generating means 12, connected to said abnormality detecting means and said running directing instruction data creating and setting means, for generating new running command data in response to an abnormal state detection signal from the abnormality detecting means 11 in accordance with predetermined procedures using the running state information including the position information from the position and heading angle measuring means 4 and the running command instruction data from the running control unit 5. The unmanned vehicle is slowed down or stopped in accordance with the type of abnormality. For this purpose, new running command instruction data is supplied from the running command instruction data generating means 12 to the running control unit 5, so that the unmanned vehicle can be driven safely with high reliability.

In a modification of the running command system shown in FIG. 5, the abnormality detecting means 11 includes an obstacle detecting means for detecting an obstacle placed across the running path. The running command instruction data generating means 12 generates the running command instruction data instructing slowdown or stopping in responses to the detection signal from the obstacle detecting means. As a result, the unmanned vehicle will neither collide with the obstacle nor be damaged. Safe travel of the unmanned vehicle is guaranteed.

According to another modification of the running command system shown in FIG. 5, the abnormality detecting means 11 includes a transmitting means such as pushbutton switches for generating signals representing temporary slowdown and stopping upon ON/OFF operations of these switches. With this arrangement, the unmanned vehicle can be temporarily slowed down or stopped. Therefore, the unmanned vehicle can be properly guided when an emergency occurs or the operator decides that an abnormal state has occurred.

In another modification of the running command system shown in FIG. 5, the abnormality detecting means 11 includes a power level detecting means for detecting a power level such as the actual state-of-charge of the battery of the unmanned vehicle when it falls below a predetermined level. The running command instruction data generating means 12 generates running command instruction data so as to perform predetermined operations in response to the detection signal from the power level detecting means. Therefore, an operator can know an abnormal power state in advance, and the unmanned vehicle will not stop at an unexpected position.

As apparent from the above description, the advantages of the various embodiments of the present invention, reside in the fact that the unmanned vehicle controlled in accordance with the path information in a coordinate system set on a road surface is guided in accordance with measured position and heading angle information, so that the unmanned vehicle can automatically move around an obstacle and can respond to an external instruction, and, in that a relatively small memory can be used to achieve a system amenable to simple instructions.

A running command system for an unmanned vehicle according to the present invention will be described in detail with reference to further embodiments.

Figure 6:
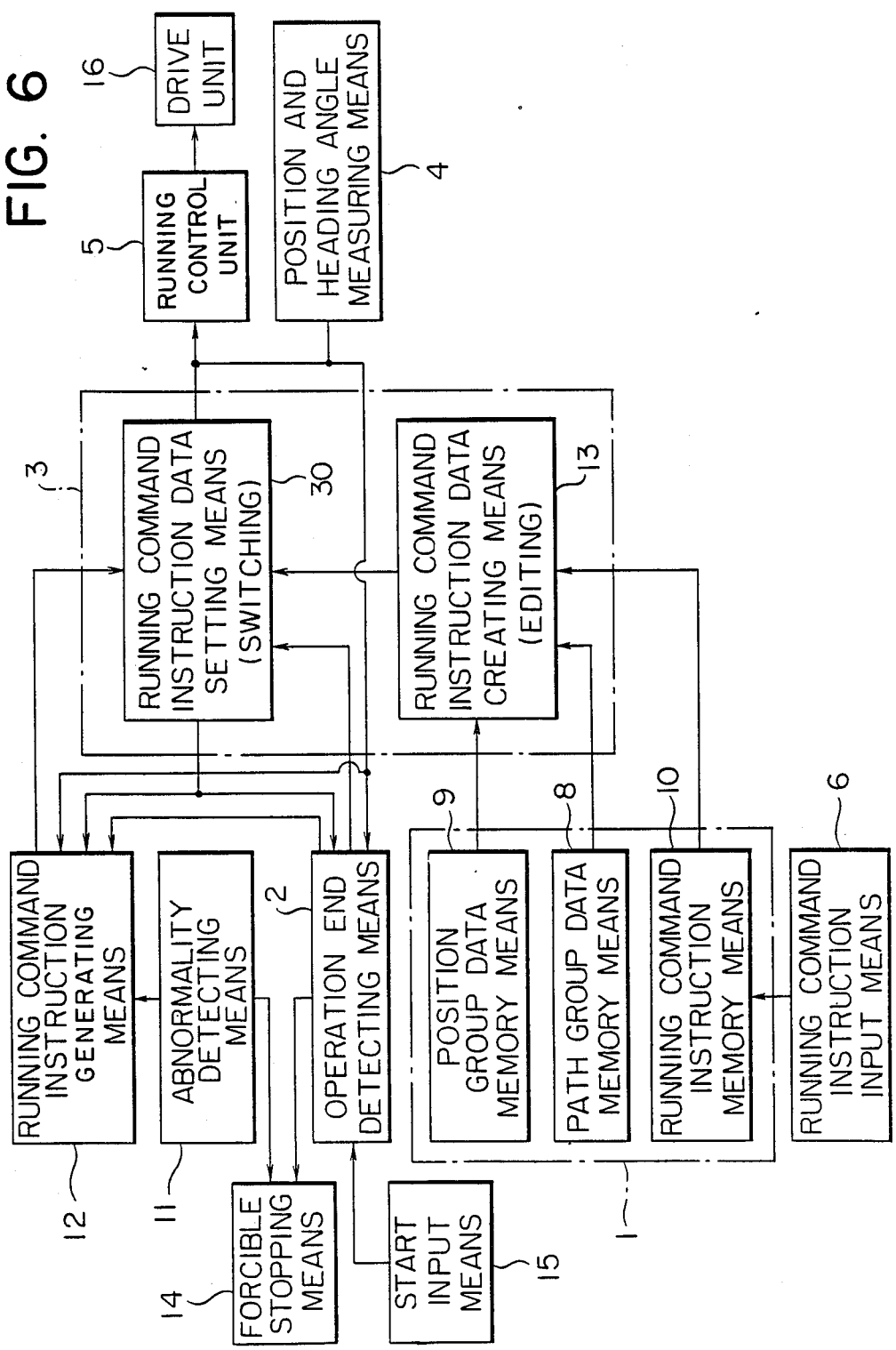
FIG. 6 is a block diagram showing an automatic guidance system including the running command system according to the present invention.

FIG. 6 shows an automatic guidance system including the running command system of the present invention. The running control unit 5 compares the position and heading angle information generated from the position and heading angle measuring means 4 and the running command instruction data generated from the running command system of the present invention. Drive values for a drive unit 16 in the unmanned vehicle are determined so as to cause the unmanned vehicle to perform the operation represented by the running command instruction data. Therefore, the unmanned vehicle can be automatically driven.

In the running command system for the unmanned vehicle according to this embodiment, the running command instruction input means 6 consisting of a keyboard and a display is used to enter running command instructions required for guiding the unmanned vehicle to the destination. The running command instructions with the sequence order are stored in the running command instruction memory means 10. The position group data memory means 9 stores coordinate information of an intersection, a position at which radius of curvature changes, and a stop position for working. The path group data memory means 8 stores start point information, end point information, radius of curvature information, and central position information for the radius of curvature with identification numbers for each path, these pieces of information representing a path obtained by connecting the coordinate positions as the position group data.

The running command instruction data creating means 13 creates running command instruction data representing the coordinate position, the path shape and the operation in accordance with the running command instruction stored in the running command instruction memory means 10, the coordinate positions stored in the position group data memory means 9, and data (the start point, the end point, the radius of curvature for the path shape, and the central position for the radius of curvature) stored in the path group data memory means 8.

The operation end detecting means 2 calculates a stopping distance required for decreasing the moving velocity from the current velocity and smoothly stopping the unmanned vehicle, a distance between the current position of the unmanned vehicle and the end or stop point of the path, a difference between the heading angle of the unmanned vehicle at the stop position set by the running command instruction data and the current heading angle thereof, a moving velocity and an azimuth angular velocity in accordance with running command instruction data set in the running control unit 5, position and heading angle information from the position and heading angle measuring means 4, and the moving velocity information and the azimuth angular velocity information which are obtained from the drive unit 16. These calculations are detected whether or not they fall within the allowable conditions in order to smoothly move the unmanned vehicle and to start the next action in accordance with the given operation mode. The operation end detecting means 2 detects whether or not the operation must be ended. The detection signal from the operation end detecting means 2 is supplied to the running command instruction data setting means 30.

The abnormality detecting means 1 detects an abnormal state from a contract sensor mounted on a bumper, an obstacle sensor comprising an ultrasonic sonar, a battery level sensor for comparing a potential at the battery with a reference potential and generating a warning signal when the battery must be recharged, and pushbutton switches used by the operator to effect an emergency stop or a temporary stop. The abnormality detecting means 11 thus detects whether or not the unmanned vehicle must be stopped normally or in emergency, or must be slowed down in accordance with the preset conditions so as to drive the unmanned vehicle safely in accordance with a detected abnormal condition. A detection signal from the abnormality detecting means 11 is supplied to the running command instruction data generating means 12. When the emergency stop made is set, a signal is immediately supplied to a forced stopping means 14 (FIG. 7B) such as a brake actuating means in order to forcibly stop the unmanned vehicle.

The running command instruction data generating means 12 generates running command instruction data upon detection of a need for an emergency stop, a normal stop or slowdown by the abnormality detecting means 11 in accordance with predetermined procedures using the current running command instruction data, the stopping distance calculated by the operation end detecting means 2 and the current position of the unmanned vehicle.

The running command instruction data setting means 30 supplies the running command instruction data from the running command instruction data generating means 13 to the running command system in response to the operation end signal generated from the operation end detecting means 2. When the running command instruction data is generated from the running command instruction data generating means 12, the running command instruction data setting means 30 supplies it to the running control unit 5. At the same time, the running command instruction data setting means 30 temporarily stores the current running command instruction data from the running control unit 5 and stores updated running command instruction data in the running control unit 5 when the means 30 receives the operation end detection signal.

Figure 7C:
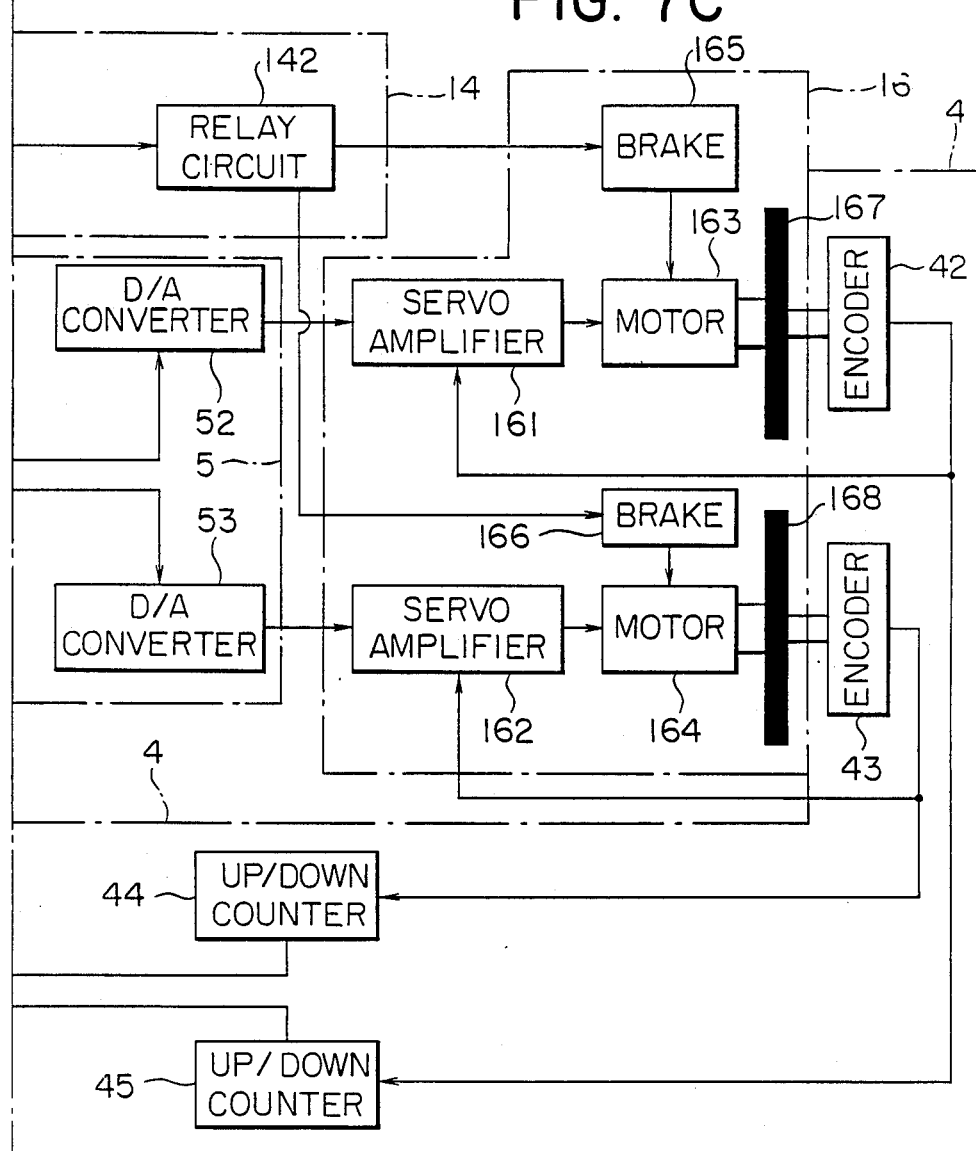
FIG. 7 is a block diagram comprised of FIGS. 7A, 7B and 7C showing the detailed arrangement of the automatic guidance system shown in FIG. 6.
Figure 7:
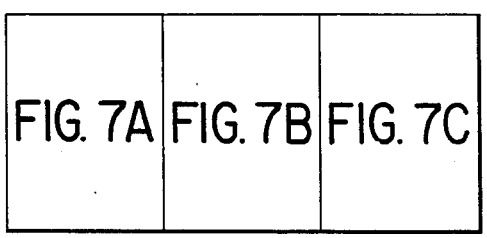
Figure 7A:
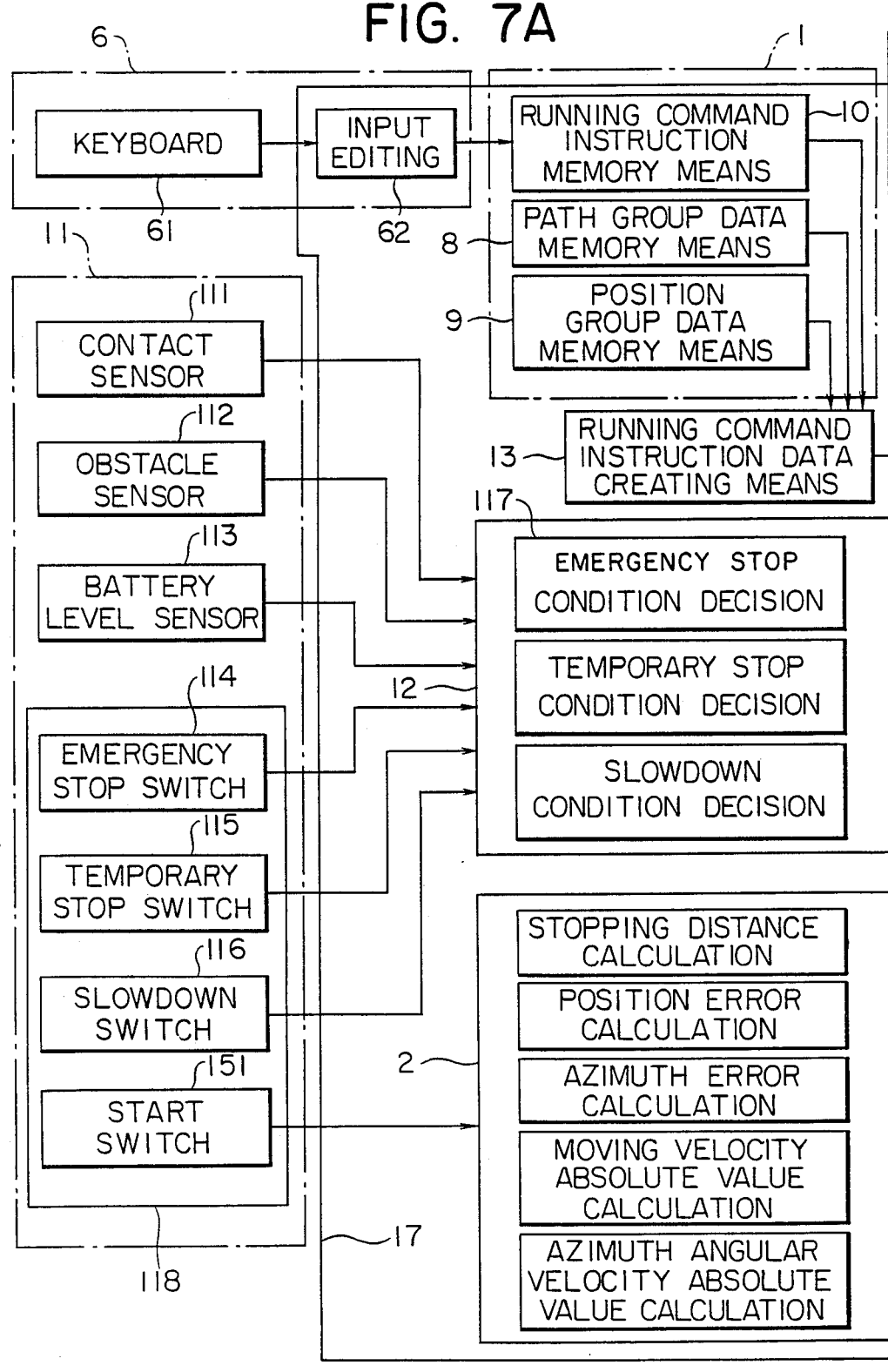
Figure 7B:
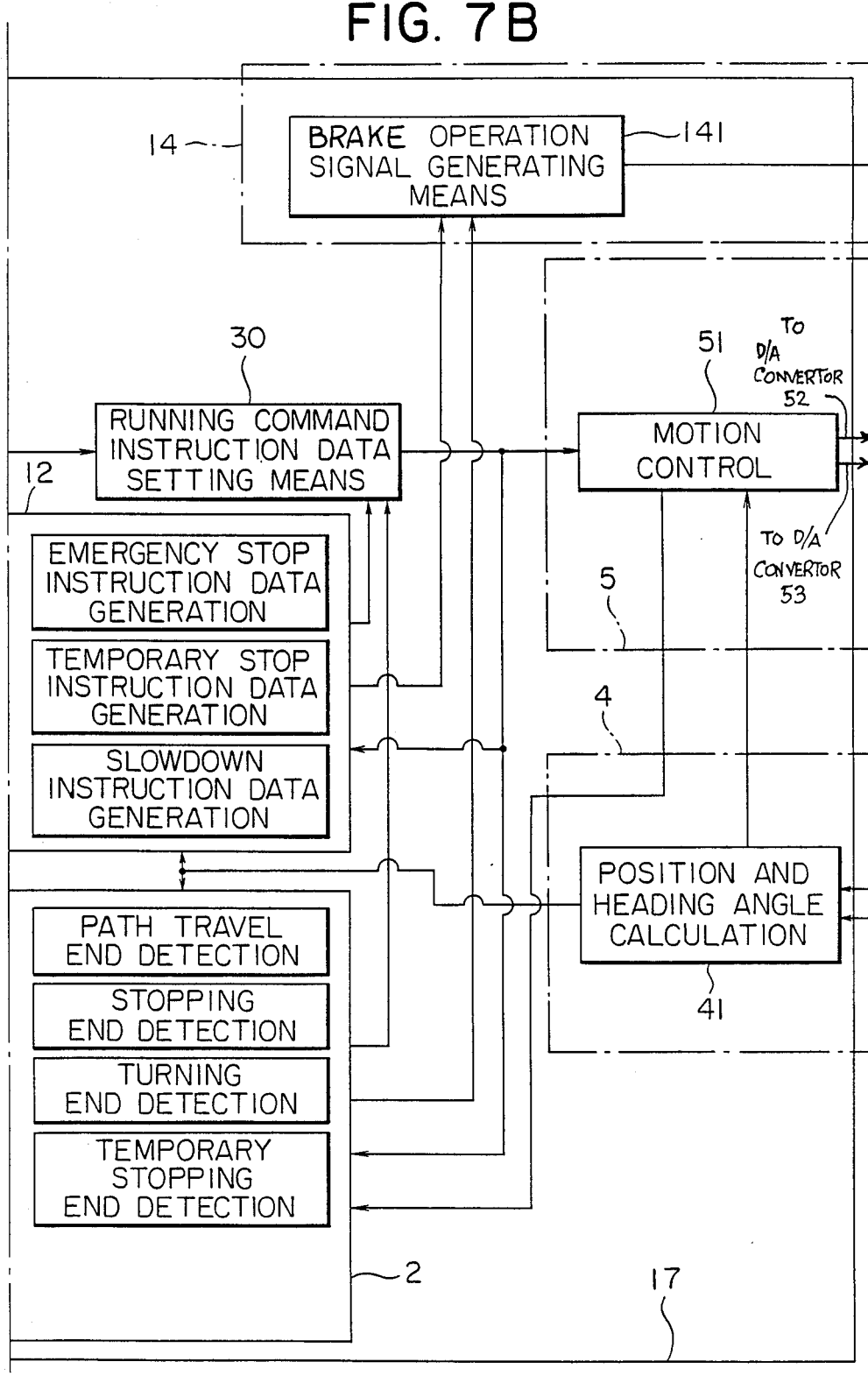
Figure 8:
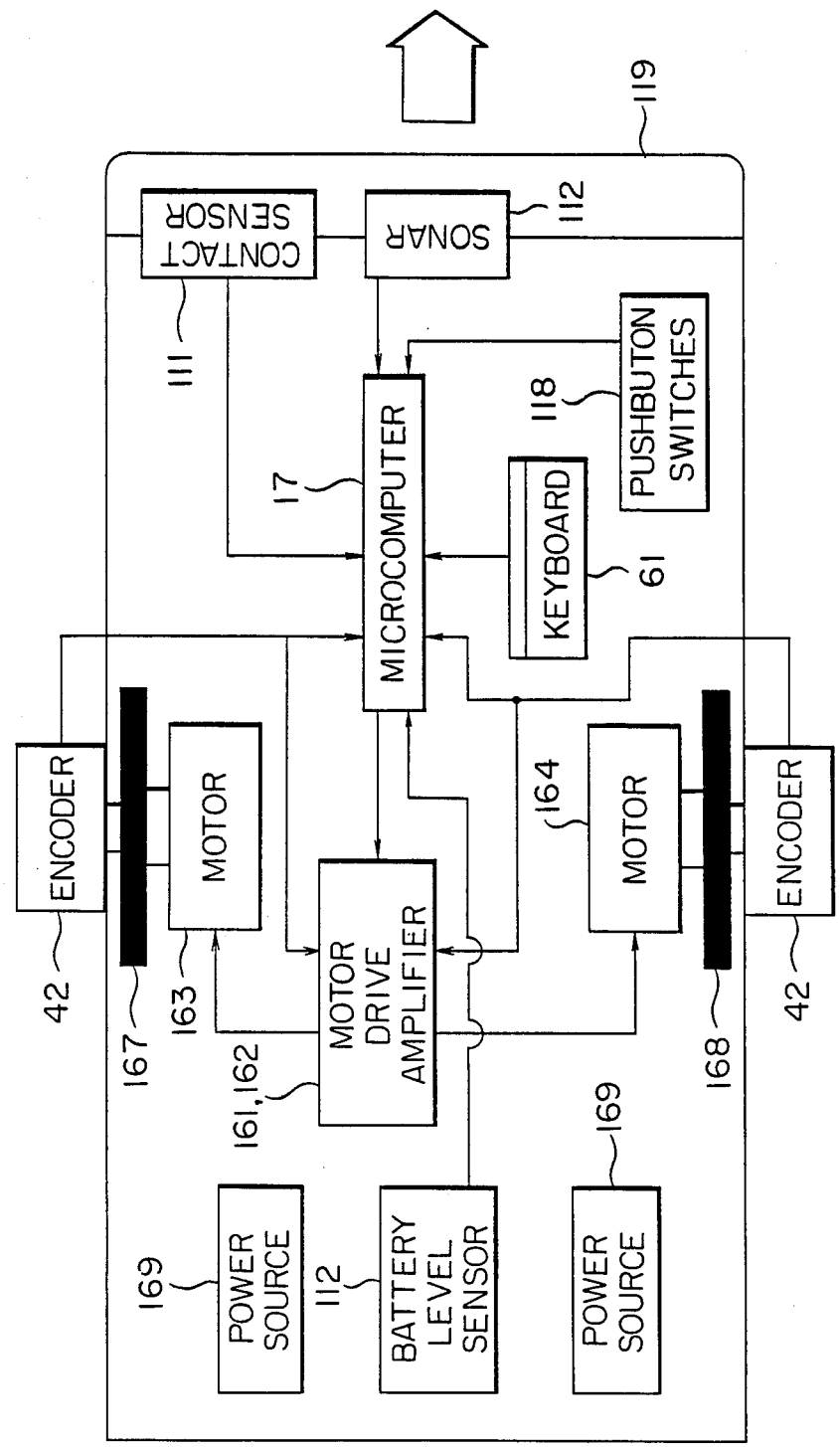
FIG. 8 is a block diagram showing the mounting state of the respective elements of the system shown in FIG. 7.

FIG. 7 shows the detailed arrangement of the system shown in FIG. 6. The section for performing signal processing such as data calculation, creation, detection and storage is constituted by a microcomputer and its program. FIG. 8 shows the internal arrangement of the components (FIG. 7) in the unmanned vehicle. Referring to FIGS. 7 and 8, the drive unit 16 comprises motors 163 and 164 for driving drive wheels 167 and 168, and servo amplifiers 161 and 162. The drive unit 16 is connected to a microcomputer 17 through D/A converters 52 and 53. The motors 163 and 164 control the rotational angles of the drive wheels 167 and 168 which are detected by rotary encoders 42 and 43 through the servo amplifiers 161 and 162 so as to match with rotational angles set by the microcomputer 17, respectively. A power source comprises a battery 169. The left and right drive wheels 167 and 168 are independently driven by the motors 163 and 164, respectively, thereby moving and turning the unmanned vehicle. The position and heading angle measuring means 4 detects the rotational angles of the drive wheels 167 and 168 through the encoders 42 and 43, so that the detected rotational angle signals are connected to the microcomputer 17 through up/down counters 44 and 45. In this state, the position and heading angle calculation program is executed under the control of the microcomputer 17, and the position and heading angle information is generated in accordance with information from the up/down counters 44 and 45. The running control unit 5 sets the drive wheels 167 and 168 at the optimal rotational angles through the D/A converters 52 and 53 in accordance with the running command instruction data and the position and heading angle information which are used in the motion control program under the control of the microcomputer 17.

The running course memory means 1, the operation end detecting means 2 and the running command instruction creating/setting means 3 are realized by the functions of the microcomputer 17. The running command instruction input means 6 comprises a keyboard 62, and an input editing function 62 of the microcomputer. The abnormality detecting means 11 comprises a contact sensor 111, an obstacle sensor 112, a battery level sensor 113, an emergency stop switch 114, a temporary stop switch 115, a slowdown switch 116, and various decision blocks and a data generation function 117 of the microcomputers 17. The contact sensor 111 comprises a bumper switch mounted in a bumper 119. The bumper switch generates a signal when an obstacle strikes against the bumper 119. The obstacle sensor 112 comprises an ultrasonic sonar. The ultrasonic sonar detects an obstacle in front of the unmanned vehicle in a noncontact manner and generates one of three types of signals having different levels in accordance with the distance to the obstacle. The battery level sensor 113 generates a signal when the battery as a power source has a voltage level which becomes less than a reference voltage due to excessive discharge. Each of the switches (in a switch group 118) such as the emergency stop switch 114, the temporary stop switch 115, the slowdown switch 116 and the start switch 115 comprises a pushbutton switch and a flip-flop. When the pushbutton switch is turned on, the corresponding flip-flop is set. The flip-flops connected to the respective pushbutton switches can be reset in response to a signal from the microcomputer 17. The microcomputer 17 receives state signals from the flip-flops and detects their states. The emergency switch 114 is connected to an interrupt input of the microcomputer 17. When the emergency stop pushbutton switch is turned on, an interrupt signal is supplied to the microcomputer 17.

In the microcomputer 17, necessary functions are obtained by calculations in accordance with the following programs: the input editing program for storing a running command instruction entered at the keyboard 61; the running command instruction data creation program for creating running command instruction data used in the motion control program in accordance with the running command instruction, the path group data and the positon group data; the abnormality detection program for providing a predetermined logical decision in accordance with the state signals from the contact sensor, the obstacle sensor, the battery level sensor and the switch group; the running command instruction data generation program for generating emergency stop, temporary stop or slowdown running command instruction data upon abnormality detection by the abnormality detection program in accordance with the predetermined procedures using the position and heading angle information derived from the position and heading angle calculation program, the moving and azimuth angular velocity information derived from the motion control program, and stopping distance information representing a distance which allows safe and smooth stopping of the unmanned vehicle; the operation end detection program for detecting whether or not the current operation corresponding to the current running command instruction data supplied to the running control unit must be ended and whether or not running command instruction data representing the next operation must be supplied to the motion control means 5 in accordance with predetermined condition given by the position and heading angle information derived from the position and heading angle calculation program, the moving and azimuth angular velocity information derived from the motion control program, and the current running command instruction data dervied from the motion control program, the current running command instruction data being supplied to the running control unit 5 on the basis of values obtained by calculating the stopping distance for a smooth stop, an end point of a path, a distance between the end point or the stop position and the current position of the unmanned vehicle, a difference between a heading angle at the stop mode and the current heading angle, and absolute values of the moving and azimuth angular velocities in accordance with the predetermined mathematical expressions, and the current running command instruction data being supplied to the running control unit 5 also on the basis of the state of the start switch of the switch group; and the running command instruction setting program for supplying to the motion control program running command instruction data derived from the running command instruction data generation program or the instruction data creation program in accordance with the detection result of the operation end detection program or the output derived from the abnormality detection program.

Figure 9:
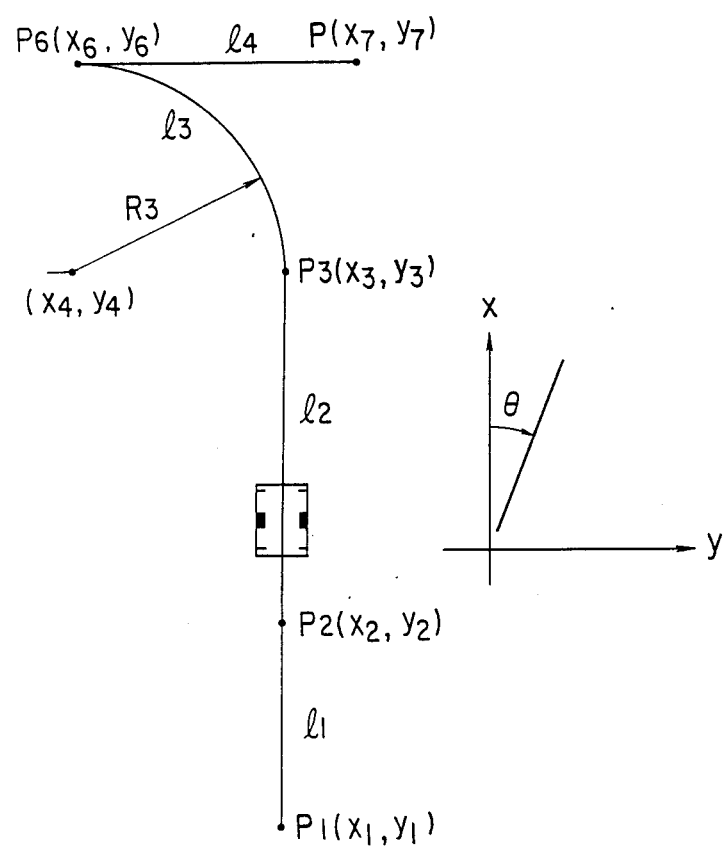
FIG. 9 is a respresentation showing a running course of the unmanned vehicle.

In this embodiment, the operations of the unmanned vehicles are traveling, normal stopping, turning and temporary stopping. The unmanned vehicle is guided in accordance with a combination of these four operations. More particularly, during traveling, the unmanned vehicle is guided at a predetermined moving velocity along a given path. During stopping, the unmanned vehicle is stopped at a given point. During turning, the unmanned vehicle is turned toward a given direction. During temporary stopping, the unmanned vehicle is braked and stopped at a given position and at a given heading angle, and waits for starting upon depression of the start button. FIG. 9 shows a running course of the unmanned vehicle. The unmanned vehicle located at point $P_1$ is sequentially driven along paths $l_1$, $l_2$, $l_3$ and $l_4$ and is guided to point $P_7$. In order to accurately guide the unmanned vehicle along this running course, the following combination of the operations of the unmanned vehicle is required.

(1) move the unmanned vehicle in the vicinity of point $P_2$ along the path $l_1$
(2) move the unmanned vehicle in the vicinity of point $P_3$ along the path $l_2$
(3) move the unmanned vehicle in the vicinity of point $P_6$ along the path $l_3$
(4) stop the unmanned vehicle at point $P_6$
(5) turn the unmanned vehicle through 180°
(6) move the unmanned vehicle in the vicinity of point $P_7$ along the path $l_4$
(7) stop the unmanned vehicle at point $P_7$ During travelling, the unmanned vehicle does not change its operation at the end point of the path but in the vicinity of the end point. In other words, the unmanned vehicle is decelerated in front of the stop position and can be smoothly stopped.

In this case, the position and heading angle among the guidance data are represented by coordinate data in a reference coordinate system and a heading angle with respect to the reference direction, thereby providing a flexible system for satisfying the unmanned vehicle route.

FIGS. 10(a) to 10(d) show data formats of the data stored in the running course memory means 1.

As shown in FIG. 10(a), the running command instruction comprises an operation name $A_2$ of the unmanned vehicle, and end point number $A_3$ for representing the position group data indicating the stop point and the end point position of the path, a path number $A_4$ for representing a path group data number indicating the path information to be given in accordance with a given motion-operation instruction, a heading angle $A_5$ with respect to the reference direction of the unmanned vehicle at the stop mode when the stopping operation is instructed; and a moving velocity $A_6$ to be given when the motion operation instruction is given. When the running command instructions are entered at the keyboard, the respective instructions are assigned the running command instruction members $A_1$, and the resultant data are stored in the running command instruction memory means 10.

The position group data comprises a position number $B_1$ given for each point for the purpose of identification, and position coordinates $B_2$ plotted in the reference coordination system given in the running path. The position group data is prestored in the position group data memory means 9.

As shown in FIG. 10(c), the path group data comprises a path member $C_1$ assigned for each path for connecting the positions represented by the position group data so as to identify the path, position numbers $C_2$ and $C_3$ of the start and end points as the two ends of the path, an identifier $C_4$ for identifying whether or not the type of path is linear or curved, coordinates $C_5$ representing the position of the center for the radius of curvature when the path comprises a curved path, and the radius of curvature $C_6$. The path group data is prestored in the path group data memory means 8.

The running command instruction data is created by the running command instruction data creating means 13 in accordance with the running command instruction using the path group data and the position group data. As shown in FIG. 10(d), the running command instruction data comprises: an operation $D_2$ given by the running command instruction; start point coordinates $D_3$ read out from the position group data memory means 9 and representing the coordinate position corresponding to the start point number $C_2$ obtained in accordance with the end point number $A_3$ and the path number $A_4$ when the operation represents traveling; end point coordinates $D_4$ read out from the position group data memory means 9 and representing the coordinate position $B_2$ corresponding to the end point number $A_3$ of the travel directing instruction; a path type $D_6$ read out from the path group data memory means 8 and corresponding to the path number $A_4$; a radius of curvature $D_9$ having the center coordinates $D_8$; a moving velocity $D_7$ given as the moving velocity $A_6$ given to the running command instruction; and a heading angle $D_5$ given to the running command instruction.

Figure 11:
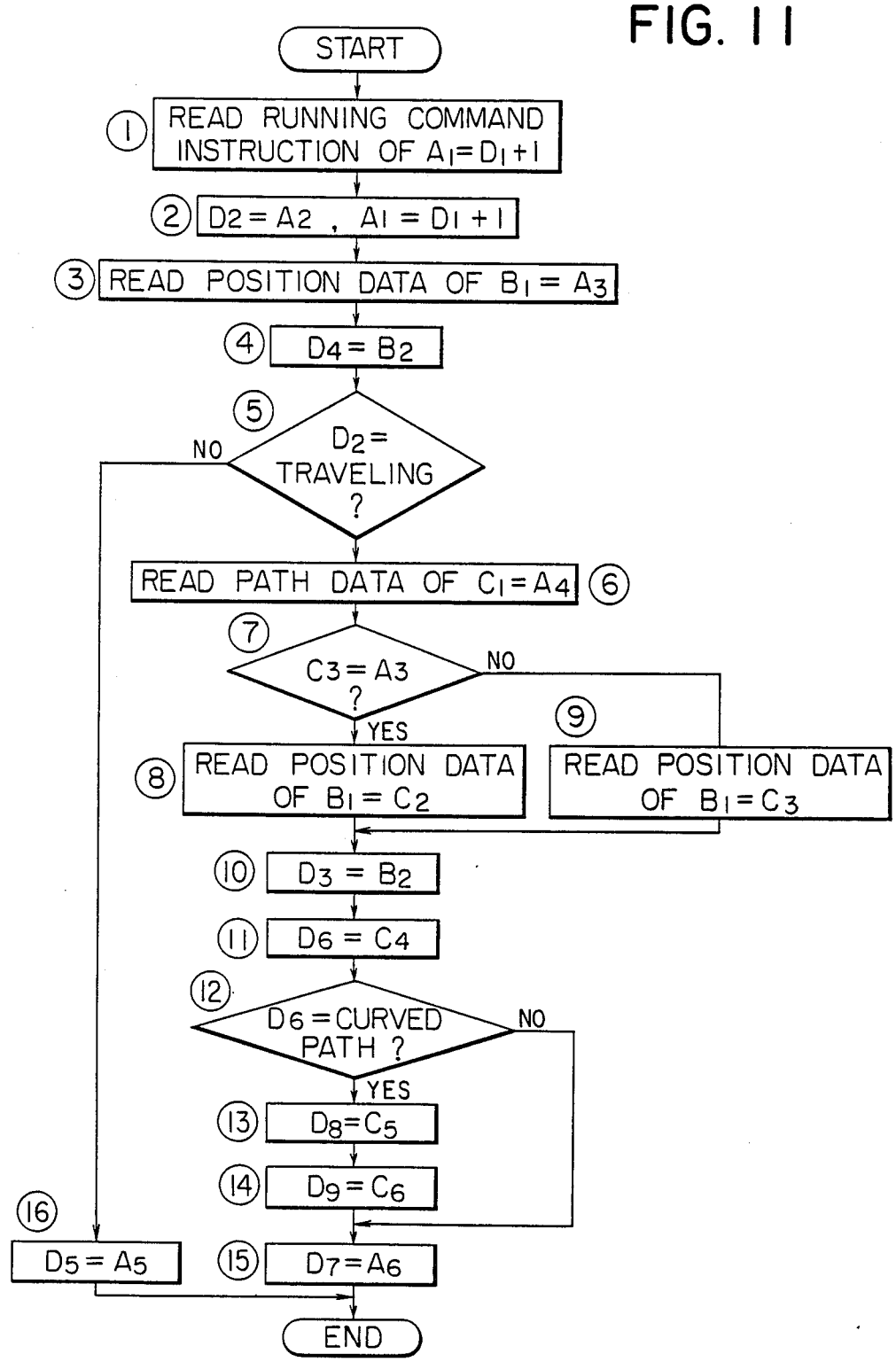
FIG. 11 is a flow chart for explaining a running command insruction data creation program.

FIG. 11 is a flow chart for creating the running command instruction data. The running command instruction $A_1 = D_1 + 1$ next to the currently set running command instruction data $D_1$ (step 1) s read out. The running path information $A_4$ in the running command instruction is assigned with the path number of the path group data for identifying the memory location of the path information. The end point or stop point information $A_3$ of the path is assigned with the position number of the position group data. Since the running command instruction data is created with reference to these data, to illustrate, first, let the running command instruction data $D_1$ be running command instruction number $A_1$, and let the operation $D_2$ be the operation name $A_2$ (step 2). The coordinate position $B_2$ of the position number corresponding to the end point number $A_3$ of the running command instruction is read out (step 3), and let the coordinate position $B_2$ be the end point coordinate $D_4$ (step 4). Subsequently, the CPU checks whether or not the operation $D_2$ represents traveling (step 5). If YES in step 5, the path data of the path number $A_4$ of the running command instruction is read out to set the corresponding path (step 6). The CPU compares the end point number $C_3$ of the running path with the end point number $A_3$ of the running command instruction to determine whether or not these data coincide with each other (step 7). If YES in step 7, the start position of traveling is given as the start point number $C_2$ of the running path (step 8). However, if NO in step 7, the start position is given as the position represented by the end point number $C_3$ of the running path in step 9. The coordinates $D_3$ of the start position are read out from the position group data memory means 9, and the read-out data are given as the start point coordinates of the running command instruction data (step 10). Let the path type $C_4$ of the path data be the path type $D_6$ of the running command instruction data (step 11). The CPU checks whether or not the path type represents a curved path (step 12). If YES in step 12, let $D_8$ be $C_5$ (step 13) and let $D_9$ be $C_5$ (step 14). Subsequently, let the moving velocity $A_6$ of the running command instruction be the moving velocity $D_7$ of the running command instruction data (step 15). However, if NO in step 5, let the heading angle $A_5$ of the running command instruction be the heading angle $D_5$ of the running command instruction data (step 16).

As described above, the running command instruction data is created in accordance with the running command instruction, the path group data and the position group data. This program is started every time the running command instruction data setting program reads out the running command instruction data from the running command instruction data creating program, thereby preparing the running command instruction data of the next operation.

Figure 12:
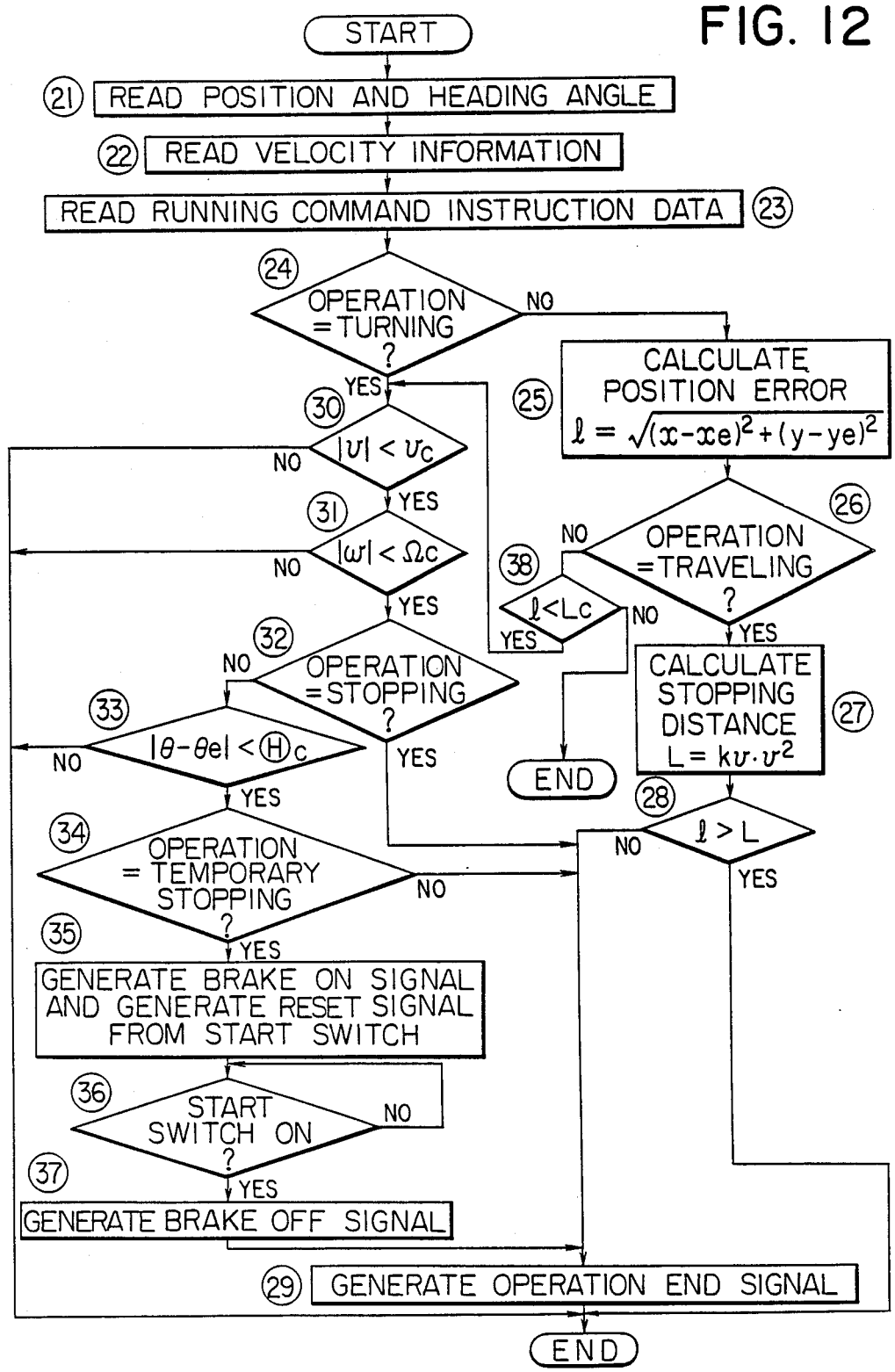
FIG. 12 is a flow chart for explaning an operation end detection program.

FIG. 12 is a flow chart of an operation end detection program. According to this program, the position and heading angle information from the position and heading angle measuring unit, the moving and azimuth angular velocity information from the running control unit and a state of the start switch among the switch group are compared with motion directing instruction data set by the running command instruction data setting program in the running control unit. The CPU then checks whether or not the running command instruction data to be set is updated. After the necessary information is read (steps 21 to 23), the values required for detecting the end conditions are calculated in accordance with the operation set by the running command instruction data setting means. In the embodiment, the end conditions of the operation are given as follows, and the unmanned vehicle is guided in accordance with the operation which satisfies these end conditions:

(1) Traveling
  (i) A position error with respect to the end point of the path is less than that corresponding to a distance in which the unmanned vehicle can be smoothly stopped.

(2) Turning
  (i) The moving velocity and the azimuth angular velocity are below the predetermined values given such that no impact is received by the vehicle even if the unmanned vehicle is forcibly and abruptly stopped by the brake.
  (ii) An error between the preset heading angle and the current heading angle of the unmanned vehicle in less than the predetermined value.

(3) Stopping
  (i) The moving velocity and the azimuth angular velocity are less than the predetermined values.
  (ii) The distance between the end point and the current position of the unmanned vehicle is less than the predetermined value.

(4) Temporary Stopping
  (i) The moving velocity and the azimuth angular velocity are less than the predetermined values.
  (ii) The distance between the end point and the current position of the unmanned vehicle is less than the predetermined value.
  (iii) An error between the preset heading angle and the current heading angle of the unmanned vehicle is less than the predetermined value.
  (iv) A start instruction is entered upon depression of the start switch.

In order to detect these conditions, the position error $l=\sqrt{(x-x_e)^2+(y-y_e)^2}$ with respect to the end point is calculated in accordance with the end point coordinate position $(x_e, y_e)$ and the position information $(x,y)$ of the running command instruction data when the operation represents traveling (step 25). The stopping distance $L=k_v \cdot v^2$ in accordance with the moving velocity information v (step 27). The CPU checks whether or not the position error l is larger than the stopping distance L (step 28). If NO in step 28, the operation end signal is generated to start the running command instruction data setting program (step 29).

When the operation represents turning in step 24, the CPU checks whether or not the absolute valve $|v|$ of the moving velocity is smaller than the predetermined value Vc (step 30) and whether or not the absolute value $|\omega|$ of the azimuth angular velocity is smaller than the predetermined value $\Omega c$ (step 31). If YES in steps 30 and 31, the CPU then checks whether or not the error $|\theta - \theta_e|$ between the preset heading angle $\theta_e$ and the current heading angle $\theta$ of the unmanned vehicle is smaller than the predetermined value $\theta_c$. If YES in step 33, the operation end signal is generated (step 33).

When the operation is detected as stopping, the position error l with resepct to the end point is calculated (step 25). The position error l is compared with the predetermined value Lc (step 38). When the position error l is smaller than the predetermined value Lc, the absolute values $|v|$ and $|\omega|$ of the moving and azimuth angular velocities are compared with the predetermined values Vc and $\Omega c$ (steps 30 and 31) whether or not these absolute values are smaller than the corresponding predetermined values. If YES in steps 30 and 31, the operation end signal is generated (step 29).

When the operation is detected as temporary stopping, the position error l with respect to the end point is calculated (step 25). When the position error is smaller than the predetermined value Lc (step 38), the absolute values $|v|$ and $|\omega|$ of the moving and azimuth angular velocities are respectively compared with the predetermined values Vc and $\Omega c$ (steps 30 and 31). When these absolute values are smaller than the corresponding predetermined values, the error $|\theta - \theta_e|$ between the predetermined heading angle $\theta_e$ and the current heading angle $\theta$ of the unmanned vehicle is compared with the predetermined value $\theta_c$(step 33). When this error is smaller than the predetermined value, a brake ON signal is generated and reset the start switch (step 35). In this state, when the start switch is turned on, the operation end signal is generated (steps 36, 37 and 29).

In the flow chart in FIG. 12, the calculation of the position error l is common in traveling, stopping and temporary stopping, so that the corresponding step 25 is executed before the decision steps 26, 32 and 34. Steps 38, 30 and 31 are common in stopping and temporary stopping and are executed before the corresponding decision steps 32 and 34.

Figure 13B:
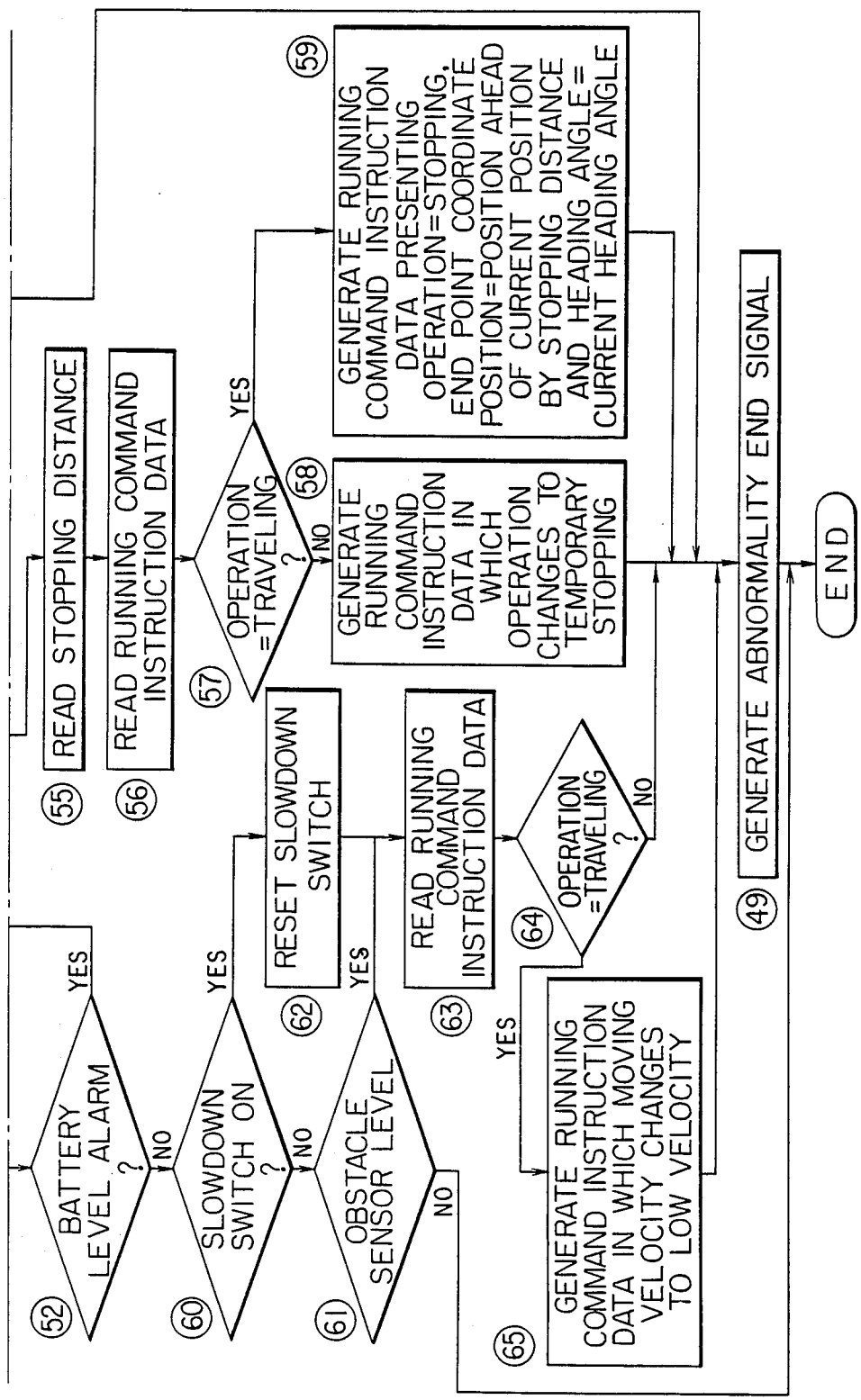
FIG. 13 is a flow chart comprised of FIGS. 13A and 13B for explaining an abnormal state detection and running command instruction data generation program.

FIG. 13 is a flow chart of the abnormality detection and running command instruction data generation program. In this program, sensor information representing the outputs from the obstacle sensor, the contact sensor and the battery level sensor, and the states of the switches excluding the start switch among the switch group are read (steps 41 and 42). The CPU checks whether or not the contact sensor and the emergency stop switch are turned on and the output from the obstacle sensor represents level 3, thereby immediately stopping the unmanned vehicle (steps 43 to 45). If one of the conditions is established, the brake ON signal is generated, and the position and heading angle information is received from the position and heading angle measuring means (steps 46 and 47). Furthermore, in order to set the running control unit in a mode for immediately stopping the unmanned vehicle, running command instruction data is generated wherein the operation represents stopping, the end coordinate position represents the current position, and the heading angle represents the current heading angle (step 48), and the end signal corresponding to abnormality is generated (step 49).

However, when the unmanned vehicle need not by urgently stopped, i.e., if NO in steps 43, 44 and 45, the CPU checks whether or not the unmanned vehicle must be temporarily stopped. In other words, the CPU checks whether or not the temporary stop switch is turned on, the obstacle sensor generates a signal representing level 2, and the battery level alarm is on (steps 50 and 51). If the temporary stop switch is on, it is reset (step 53). However, if the CPU detects that temporary stopping is required, the position and heading angle information from the position and heading angle measuring means, the stopping distance calculated in accordance with the operation end detection program and the running command instruction data set in the running control unit are read (steps 54 to 56). The CPU checks whether or not the operation in the running command instruction represents traveling (step 57). If NO in step 57, the running command instruction data is updated wherein the operation represents temporary stopping (step 58), and the abnormality end signal is generated (step 49). However, if the operation is detected to represent traveling, running command instruction data is generated wherein the operation represents temporary stopping, the end point position is ahead of the current position by the stopping distance, and the heading angle represents the current heading angle (step 59), and the abnormality end signal is generated (step 49). When temporary stopping is not required, the CPU checks if slowdown is required. In other words, the CPU checks whether or not the slowdown switch is turned on, and the obstacle sensor generates a signal representing level 1 (steps 60 and 61). When the slowdown switch is turned on, it is reset (step 62). When the CPU detects that slowdown is required, the running command instruction data set in the running control unit is read (step 63). New running command instruction data is generated wherein the moving velocity is a low velocity (steps 64 and 65) only when the operation represents traveling. The abnormal end signal is generated (step 49).

Figure 14:
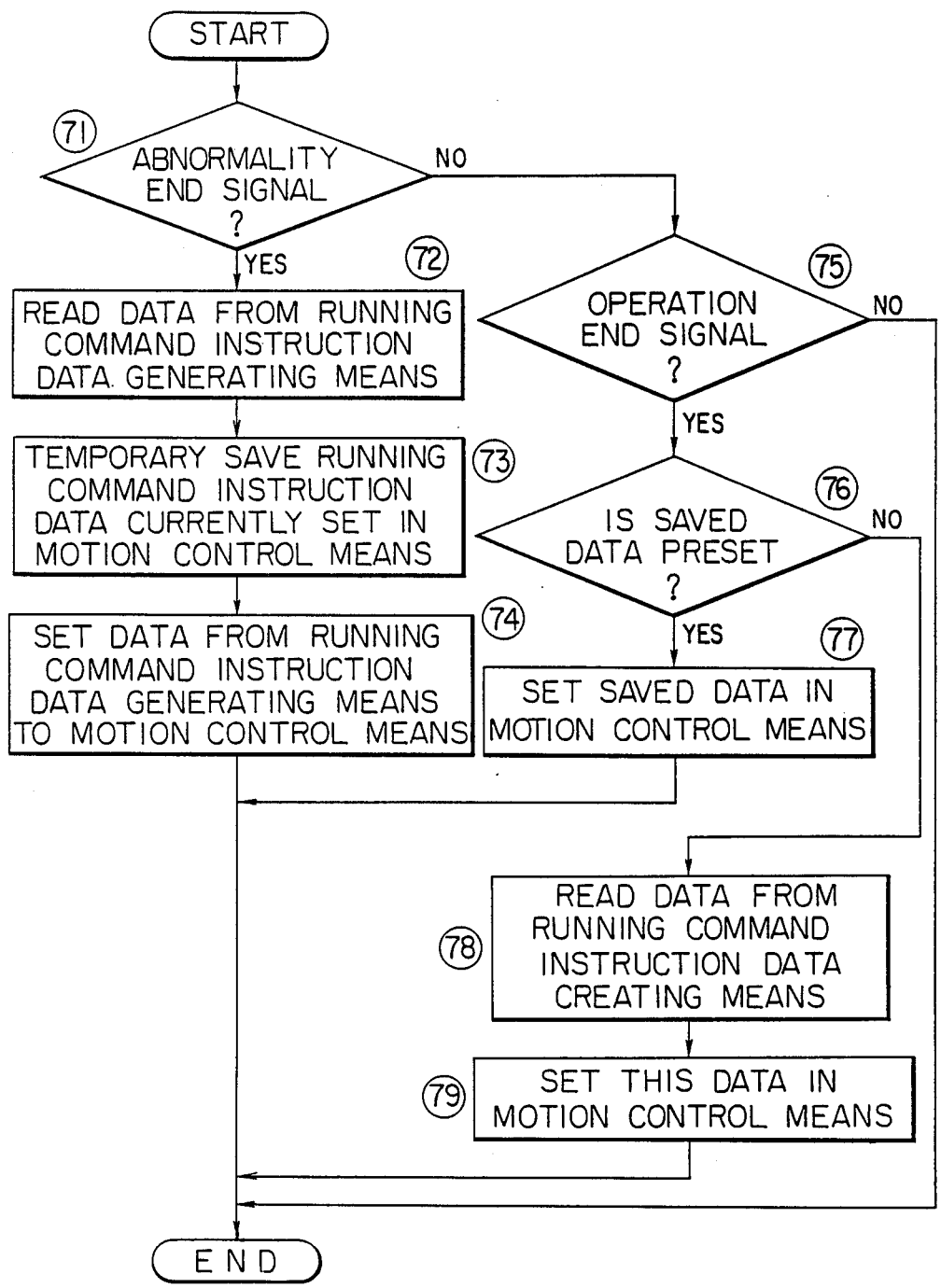
FIG. 14 is a flow chart for explaining a running command instruction data setting program.

FIG. 14 is a flow chart of the running command instruction data setting program. In this program, running command instruction data for the next operation is supplied to the running control unit in accordance with the decision results of the abnormality detection program and the operation end detection program. The CPU checks whether or not the abnormality detection program generates the abnormality end signal (step 71). If YES in step 71, the running command instruction data is read in accordance with the running command instruction data generation program (step 72). The currently set running command instruction data is temporarily saved (step 73), and the read running command instruction data is set in the motion control means (step 74). When the abnormality end signal is not generated, the CPU checks in accordance with the operation end program whether or not the operation end signal is generated (step 75). When the CPU detects that the operation end signal is generated, the CPU checks whether or not the temporarily saved running command instruction data is present (step 76). If YES in step 76, the data is set in the running control unit (step 77). However, if NO in step 76, the running command instruction data derived from the running command instruction data creation program is set in the running control unit (steps 78 and 79).

Figure 15:
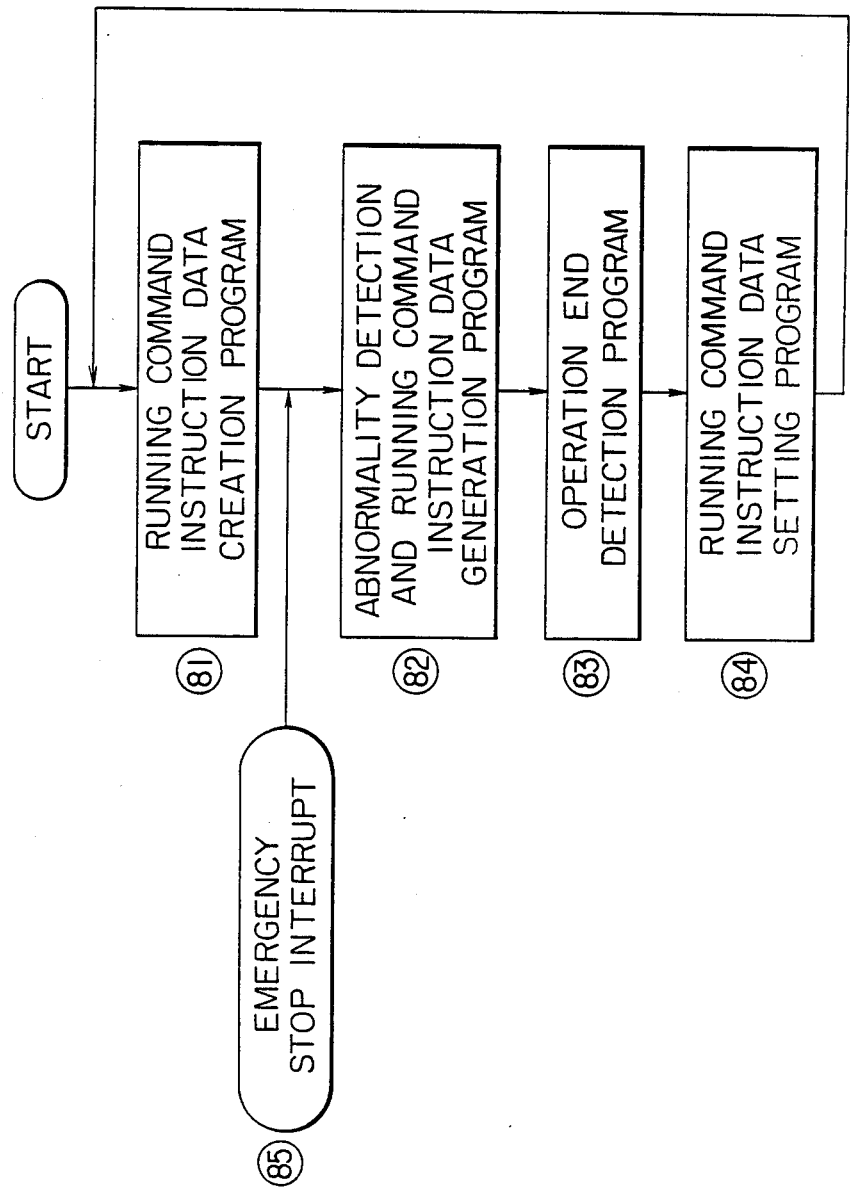
FIG. 15 is a flow chart of an overall program including all the programs shown in FIGS. 11 to 14.

FIG. 15 is a flow chart showing the entire program flow of the programs described with reference to FIGS. 11 to 14. The running command instruction data creation program, the abnormality detection and running command instruction data generation program, the operation end detection program and the running command instruction data setting program are sequentially and repeatedly performed. When an interrupt signal is generated from the emergency stop switch, the abnormality detection and running command instruction data generation program of the loop of the entire program flow is performed.

In the above embodiment, parts of the running course memory means, the running command instruction data creating/setting means, the operation end detecting means, and the abnormality detecting means are realized by the microcomputer and a combination of the above-mentioned programs. However, combinations of separate analog calculation circuits or digital logic circuits may be used to achieve part or all functions obtained by the programs described above.

What is claimed is:

1. A running command system for supplying running command instruction data corresponding to operations including travelling, stopping and turning to a running control unit of an unmanned vehicle to indicate the required operation and the position of the path by which the unmanned vehicle can travel to a destination, said command system comprising:

a position and heading angle measuring means for detecting prevailing running state values including position and heading angle of the unmanned vehicle; and for generating running state data for leading the unmanned vehicle to the destination;

running course memory means for storing information including a series of paths leading to the destination and the position of each path with reference to a coordinate system;

a running command instruction data creating and setting means connected to the running control unit:

operation end detecting means connected to the position and heading angle measuring means and to the running command instruction data creating and setting means;

(1) for comparing the current position and heading angle information of the running state data generated by the position and heading angle measurement means with the position of the path and an end point thereon given as running command instruction data currently supplied to the running control unit by the running command instruction data creating and setting means, and (2) for transmitting an operation end signal to the running command instruction data creating and setting means when the result of the comparing operation (1) satisfies terminating conditions which are determined according to the current running command instruction, said operation end signal being transmitted to said running command instruction data creating and setting means before the unmanned vehicle reaches said end point of its current path;

said running command instruction data creating and setting means being connected to said running course memory means and to said operation and detecting means for supplying the running command instruction data for the next operation to the running control unit, upon transmission of the operation end signal by said operation end detecting means to the running command instruction data creating and setting means, in accordance with said information relating the series of paths which is stored in said running course memory means; and said running control unit performs said next operation after completion of the operation represented by the running command instruction data currently supplied to the running control unit.

2. A system according to claim 1, further comprising running command instruction input means, connected to said running course memory means, to externally input the path information which represents the route up to the destination and which is to be stored in said running course memory means.

3. A system according to claim 1 wherein said running course memory means comprises a running command instruction data memory means for storing the running command instruction data which is supplied to the running control unit and which corresponds to the required operation so as to guide the unmanned vehicle to the destination.

4. A system according to claim 1, wherein said running course memory means comprises: path group data memory means, connected to said running command instruction data creating and setting means, for storing information of a start point, an end point, and a shape of each of the paths of a course; position group data memory means, connected to said running command instruction data creating and setting means, for storing coordinate position information representing feature points such as the start and end points of the path; and running command instruction memory means, connected to said running command instruction data creating and setting means, for storing the path sequence data for guiding the unmanned vehicle to the destination.

5. A system according to claim 1 wherein said operation end detecting means comprises parameter calculation means comprising
    stopping distance calculation means for calculating a stopping distance required for stopping the unmanned vehicle by smoothly reducing the velocity of the unmanned vehicle to zero,
    position error calculation means for calculating a distance between an end point or a stop point of the path and the current position of the unmanned vehicle, heading error calculation means for calculating a difference between a predetermined heading angle at the stop point and a current heading angle of the unmanned vehicle, and
    velocity calculation means for calculating a moving velocity and an azimuth angular velocity, said parameter calculation means effecting calculation from the following data:
    the running command instruction data set in the running control unit by the running command instruction data creating and setting means and
    the current running state data generated by the position and head measuring means of the unmanned vehicle; and operation end signal generating means for transmitting the operation end signal to said running command instruction creating and setting means when the values calculated by said parameter calculation means satisfy predetermined conditions so as to make it possible to smoothly execute the next operation.

6. A system according to claim 1 wherein said operation end detecting means comprises: position error calculating means for calculating a position error $l=\sqrt{(x_e-y)^2+(x-y_e)^2}$ representing a distance to the end point in accordance with an end point coordinate position $(x_e, y_e)$ and current position information information $(x,y)$ of the unmanned vehicle when the operation set by said running command instruction data creating and setting means represents traveling; stopping distance calculating means for calculating a stopping distance $L=k_r \cdot v^2$ in accordance with moving velocity information v, and the value $k_r$ is predetermined according to characteristics of the drive unit of the unmanned vehicle;
    and path travel end detecting means for comparing the position error l and the stopping distance L and for generating an operation end signal when the position error l is smaller than the stopping distance L.

7. A system according to claim 1 wherein said operation end detecting means comprises:
    absolute value calculating means for calculating an absolute value $|v|$ of moving velocity and an absolute value $|\omega|$ of azimuth angular velocity of the unmanned vehicle when the operation set by said running command instruction data creating and setting means represents turning;
    and turning end detecting means connected to said absolute value calculating means and said running command instruction data creating and setting means for (1) comparing the absolute values calculated by said absolute value calculating means with predetermined threshold values Vc and $\Omega$c, respectively, (2) comparing an error between the predetermined heading and the current heading angle of the unmanned vehicle with a predetermined value $\theta$c when the absolute values are smaller than the predetermined values Vc and $\Omega$c, and (3) transmitting an operation end signal to said running command instruction data creating and setting means when the error is smaller than said predetermined value $\theta$c.

8. A system according to claim 1, wherein said operation end detecting means comprises: position error calculating means for calculating a position error l representing a distance up to the end point when the operation set by said running command instruction data creating/setting means represents stopping; and stopping end detecting means for comparing the position error l with a predetermined value Lc, comparing absolute values $|v|$ and $|\omega|$ of moving and azimuth angular velocities with predetermined values Vc and $\Omega$c when the position error l is smaller than the predetermined value Lc, and generating an operation end signal when the absolute values $|v|$ and $|\omega|$ are smaller than the predetermined values Vc and $\Omega$c.

9. A system according to claim 1 further comprising a start switch connected to said operation end detecting means and to a brake of the unmanned vehicle for being in ON state by manual operation and for being in OFF state when said brake comes ON, and
    wherein said operation end detecting means comprises: position error calculating means for calculating a position error $l=\sqrt{(x_e-y)^2+(x-y_e)^2}$ representing a distance up to the end point when the operation set by said running command instruction data creating and setting means represents stopping; and temporary stopping end detecting means for comparing the position error l with a predetermined value Lc, comparing absolute values of $|V|$ and $|\omega|$ representing linear and angular velocities respectively with predetermined values Vc and $\Omega$c when the position error l is smaller than the predetermined value Lc, comparing an error $\theta - \theta_e$ between the heading angle $\theta_e$ obtained from current running command instruction data and a current heading angle $\theta$ of the unmanned vehicle with a predetermined value $\Omega$c when the absolute values $|V|$ and $|\omega|$ are smaller than the predetermined values $V_c$ and $\Omega$c, generating a brake ON signal to cause the start switch to turn off, when the error is smaller than the predetermined value Lc, and transmitting an operating end signal to said running command instruction creating and setting means when the start switch is switched to ON state.

10. A system according to claim 4 wherein said running command instruction data creating and setting means comprises running command instruction data creating means connected to said running command instruction memory means, said position group data memory means and said path group data memory means for creating running command instruction data representing a coordinate position, a path shape and an operation of the unmanned vehicle in accordance with the running command instruction stored in said running command instruction memory means and coordinate position data of a point stored in said position group data memory means, and data of a start point, an end point, a radius of curvature representing a path type, and a center of the radius of curvature of the path stored in said path group data memory means.

11. A system according to claim 1, further comprising: abnormality detecting means for detecting an abnormal state in which the unmanned vehicle is not properly driven along the preset running path; and running command instruction data generating means, connected to said abnormality detecting means and said running command instruction data creating and setting means, for generating new running command instruction data upon detection of the abnormal state by said abnormality detecting means in accordance with predetermined procedures using running state information of the unmanned vehicle and the running command instruction data currently supplied to the running control unit.

12. A system according to claim 11, wherein said abnormality detecting means includes obstacle detecting means for detecting an obstacle located on the running path, and said running command instruction data generating means generates the running command instruction data representing slowdown or stopping upon detection of the obstacle by said obstacle detecting means.

13. A system according to claim 11, wherein said abnormality detecting means includes transmitting means including pushbutton switches connected to said running command instruction data generating means to temporarily slow down or stop the unmanned vehicle based on the running command instruction data representing slowdown or stopping in accordance with the state of said switches.

14. A system according to claim 11, wherein said abnormality detecting means includes power level detecting means connected to said running command instruction data generating means for transmitting a signal to said running command instruction data generating means when the current power level of a power source of the unmanned vehicle becomes less than a predetermined value.

15. A system according to claim 11, wherein said abnormality detecting means includes
an obstacle sensor connected to said running command instruction data generating means and to the brake of the unmanned vehicle for transmitting a signal to the brake of the unmanned vehicle to stop the unmanned vehicle and for transmitting an emergency signal to said running command instruction data generating means when the unmanned vehicle approaches or contacts an obstacle, and an emergency stop switch connected to said running command instruction data generating means and to the brake of the unmanned vehicle for transmitting a signal to the brake of the unmanned vehicle to stop the unmanned vehicle and for transmitting an emergency signal to effect an emergency stop to said running command instruction data generating means when manually instructed to urgently stop; and said running command instruction data generating means comprises:

means for monitoring said obstacle sensor and said emergency stop switch and for generating the emergency stop signal according to a predetermined condition, means for generating emergency stop instruction data to actuate the brake of the unmanned vehicle when said monitoring means detects that the unmanned vehicle is to be urgently stopped, and means, responsive to the position and heading angle information of the unmanned vehicle, for generating running command instruction data representing temporary stopping, the current position and the heading angle, for generating an abnormality end signal.

16. A system according to claim 11, wherein said abnormality detecting means includes
an obstacle sensor connected to said running command instruction data generating means for transmitting a signal when the unmanned vehicle is at a predtermined distance from an obstacle, a power level sensor connected to said running command instruction data generating means and to the power source of the unmanned vehicle for transmitting a signal to said running command instruction data generating means when the present power level of the power source becomes lower than a predetermined value, and a temporary stop switch connected to said running command instruction data generating means for transmitting a signal to said running command instruction data generating means when manually instructed to effect a temporary stop; and said running command instruction data generating means further comprises;

means for monitoring said obstacle sensor and said temporary stop switch and for detecting whether or not the unmanned vehicle is to be temporarily stopped, means for storing the position and heading angle information of the unmanned vehicle, the stopping distance calculated by said operation end detecting means, and the running command instruction data set in said running control unit when said monitoring means detects that the unmanned vehicle is to be temporarily stopped, means for detecting whether or not the operation of the running command instruction data represents traveling;

means for generating new running command instruction data whose operation represents temporary stopping and for generating an abnormality end signal when the operation does not represent traveling, and means for generating new running command instruction data when the operation thereof represents temporary stopping, the end position represents a position ahead of the current position by the stopping distance, and the heading angle represents the current heading angle, and for generating the abnormality end signal when the operation represents traveling.

17. A system according to claim 11, wherein said abnormality detecting means comprises a slowdown sensor connected to said running command instruction data generating means for detecting the presence of an obstacle, and for transmitting a signal to said running command instruction data generating means when the obstacle is detected, and a slowdown switch connected to said running command instruction data generating instruction data generating means when an operator manually instructs the unmanned vehicle to slowdown; and said running command instruction data generating means further comprises:

means for monitoring said slowdown sensor and said slowdown switch and for detecting whether or not the unmanned vehicle is to be slowed down;

means for detecting whether or not the running command instruction data curently set in said running control unit of the unmanned vehicle represents running when said monitoring means detects that the unmanned vehicle is to be slowed down, and means for immediately generating an abnormality end signal when the set data does not represent running and for generating new running command instruction data when the value of moving velocity, supplied by the running command instruction data creating and setting means, represents a low velocity and generating the abnormality end signal when the set data represents running.

18. A system according to claim 11, wherein said running command instruction data creating and setting means comprises:

means for detecting whether or not the abnormality end signal is generated from said running command instruction data generating means;

means for temporarily saving the running command instruction data curently set in the running control unit and for setting the running command instruction data from the running command instruction data generating means in said running control unit when the abnormality end signal is generated;

means for detecting whether or not the operation end signal is generated from said operation end detecting means when the abnormality end signal is not generated;

means for detecting whether or not the saved running command instruction data has been temporarily saved when the abnormality end signal is generated; and means for setting the saved running command instruction data in said running control unit when the saved running command instruction data is detected to be saved, and for setting the running command instruction data from said running command instruction data creating and setting means, for creating running command instruction data representing a coordinate position, a path shape and an operation of the unmanned vehicle in accordance with the running command instruction stored in said running course memory means, when the saved running command instruction data is detected not to be saved.

19. A system according to claim 4, further comprising: abnormality detecting means for detecting an abnormal state wherein the unmanned vehicle is not properly driven along the preset running path; and running command instruction data generating means, connected to said abnormality detecting means and said running command instruction data creating and setting means, for generating new running command instruction data upon detection of the abnormal state by said abnormality detecting means in accordance with predetermined procedures using running state information of the unmanned vehicle and the running command instruction data currently supplied to the running control unit.

* * * * *